United States Patent
Rella et al.

(10) Patent No.: US 12,407,582 B2
(45) Date of Patent: Sep. 2, 2025

(54) METHOD THE REPRESENTATION AND OPERATION OF PRODUCTION RESOURCES, IN PARTICULAR FOR THE PLASTICS-PROCESSING INDUSTRY

(71) Applicant: Wittmann Technology GmbH, Vienna (AT)

(72) Inventors: Johannes Rella, Payerbach (AT); Michael Peter Wittmann, Leobendorf (AT)

(73) Assignee: Wittmann Technology GmbH, Vienna (AT)

( * ) Notice: Subject to any disclaimer, the term of this patent is extended or adjusted under 35 U.S.C. 154(b) by 808 days.

(21) Appl. No.: 17/610,868

(22) PCT Filed: May 9, 2020

(86) PCT No.: PCT/AT2020/060190
§ 371 (c)(1),
(2) Date: Nov. 12, 2021

(87) PCT Pub. No.: WO2020/227744
PCT Pub. Date: Nov. 19, 2020

(65) Prior Publication Data
US 2022/0260966 A1    Aug. 18, 2022

(30) Foreign Application Priority Data
May 15, 2019    (AT) ............... A 50437/2019

(51) Int. Cl.
*G05B 19/406* (2006.01)
*G05B 19/4063* (2006.01)
(Continued)

(52) U.S. Cl.
CPC .......... *H04L 41/22* (2013.01); *G05B 19/4063* (2013.01); *G05B 19/4069* (2013.01);
(Continued)

(58) Field of Classification Search
USPC ........................................ 700/182
See application file for complete search history.

(56) References Cited

U.S. PATENT DOCUMENTS 6,185,477 B1    2/2001  Palm et al.
7,092,771 B2 *  8/2006  Retlich ............ G05B 19/41885
                                                700/83
(Continued)

FOREIGN PATENT DOCUMENTS

AT    501 786 A1    1/2007
AT    11 172 U1     5/2010
(Continued)

OTHER PUBLICATIONS

WO-0231610-A2 (Year: 2002).*
(Continued)

*Primary Examiner* — Hien D Khuu
(74) *Attorney, Agent, or Firm* — GREENBLUM & BERNSTEIN, P.L.C.

(57) ABSTRACT

A method for the representation and operation of production resources, in particular for the plastics-processing industry, on one or several central operating units, preferably a computer or control station. Symbols for the production resource connected via a network or the management tools associated with the production resource, such as configuration systems or database systems, are present and selectable on the central operating unit, wherein after selection of one or several symbols on the screen of the operating unit, the visualization, in particular the visualization component from the associated production resources or management tool is started or executed on the operating unit. Subsequently, complete representation and operation is possible through (Continued)

Figure 1:
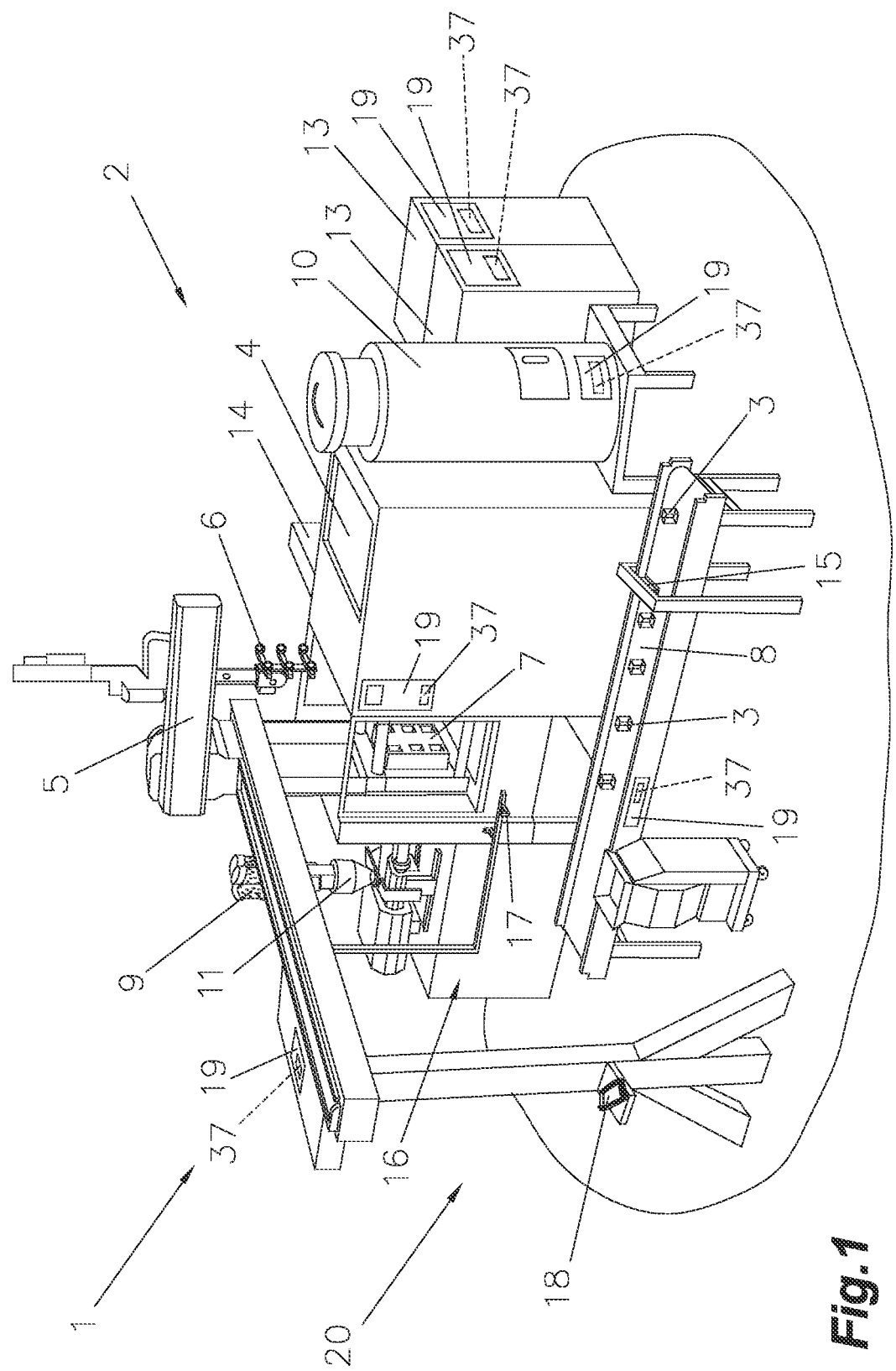

the cooperation of the visualization software available at the operating unit and a control software running decentrally in the production resources.

15 Claims, 8 Drawing Sheets

(51) Int. Cl.
  *G05B 19/4069* (2006.01)
  *G05B 19/409* (2006.01)
  *H04L 41/22* (2022.01)

(52) U.S. Cl.
  CPC .... *G05B 19/409* (2013.01); *G05B 2219/2624* (2013.01); *G05B 2219/33305* (2013.01)

(56) References Cited

U.S. PATENT DOCUMENTS

| | | | |
|---|---|---|---|
| 2004/0158412 A1* | 8/2004 | Friedrich | G05B 19/41885 702/31 |
| 2007/0186144 A1 | 8/2007 | Stange et al. | |
| 2010/0138031 A1 | 6/2010 | Werfeli et al. | |
| 2010/0274379 A1* | 10/2010 | Hehl | B29C 45/762 700/200 |
| 2012/0290108 A1 | 11/2012 | Wolf | |
| 2016/0282854 A1* | 9/2016 | Jauquet | G05B 19/042 |
| 2016/0284128 A1* | 9/2016 | Michalscheck | G05B 23/0216 |
| 2018/0046178 A1* | 2/2018 | Sabato | G05D 1/0016 |
| 2018/0285395 A1* | 10/2018 | Luo | G06F 16/2282 |
| 2018/0299863 A1* | 10/2018 | Caine | H04L 67/12 |
| 2020/0097077 A1* | 3/2020 | Nguyen | G06F 3/017 |
| 2020/0099762 A1* | 3/2020 | Eckhardt | G05B 19/4186 |

FOREIGN PATENT DOCUMENTS

| | | | |
|---|---|---|---|
| EP | 0 852 031 B1 | | 3/2001 |
| EP | 1932618 A1 | * | 6/2008 |
| EP | 2453326 A1 | * | 5/2012 |
| WO | 2006/042788 A1 | | 4/2006 |
| WO | 2008/071669 A1 | | 6/2008 |

OTHER PUBLICATIONS

WO-2006042788-A1 (Year: 2006).*
International Search Report issued in International Patent Application No. PCT/AT2020/060190, dated Jul. 22, 2020, along with an English language translation thereof.
Written Opinion of the International Searching Authority issued in International Patent Application No. PCT/AT2020/060190, dated Jul. 22, 2020.
International Preliminary Report on Patentability issued in International Patent Application No. PCT/AT2020/060190, dated Mar. 2, 2021, along with An English language translation thereof.

* cited by examiner

METHOD THE REPRESENTATION AND OPERATION OF PRODUCTION RESOURCES, IN PARTICULAR FOR THE PLASTICS-PROCESSING INDUSTRY

The invention relates to a method for the representation and operation of production resources, or devices, in particular for the plastics-processing industry, as described in the preamble of claim 1.

Systems are known from the state of the art in which, by means of appropriate programming or manual compilation of production resources, respectively, an industrial installation can be represented on a central operating unit which, by means of appropriate linkages, can be connected for the transfer of data via a network to the actual production resources, or production devices. A disadvantage here is that great effort in terms of time is necessary to set up the industrial installation at a central operating unit. The expression "production resource" as used herein, can be considered "production device."

Another disadvantage here is that a software update on a production resource may sometimes also require a software update on the central operating unit(s), since the newer software version offers, for example, extended input options or extended data structures to be displayed. The software statuses of two or several operating units must therefore be manually adapted to the software status in the production resources.

Another disadvantage is that, in the case of modular and flexible combination of production resources to form an industrial installation, as is the case in the injection molding industry, in order to produce a variety of injection-molded parts, all possible production resources and, ideally, all possible software versions of these production resources must already be available on the central operating units so that a fully comprehensive and correct representation of the user interface of the respective production resources is possible.

For example, EP 0 852 031 B1 discloses an automation system for controlling and regulating machines and systems in the plastics industry, in particular for blow-molding machines, with programmable logic controllers (PLCs) via which control and regulating functions of the machines and systems can be performed in the desired manner and which have at least one operating and monitoring device and a local bus, wherein the programmable logic controllers (PLCs) have digital technology modules (10) which simulate individual electrical circuit parts and with which the desired open-loop and closed-loop control functions can be implemented in a modular manner and which are connected to one another and to the user platform via data interfaces.

Regarding integration of industrial robots in plastics-processing machines, for example WO 2006/042788 A1 also disclose the transfer of the entire screen content from subsystems, such as industrial robots and peripheral devices to the plastics-processing machine. Likewise, programs available commercially or as open-source software are known that allow complete screen transfer and operation via touch from one network participant to another with the help of the same mechanism (VNC—screen mirroring). The disadvantage here is that transfer of all or part of the screen content represents a large volume of data and thus burdens the network bandwidth and is not sufficient, for example, to transmit production workflows with a sufficient refresh rate or high resolution, i.e. the images "flicker".

The objective of the present invention is therefore to create such a method for the representation and operation of production resources, in particular for the plastics-processing industry, whereby on the one hand the disadvantages described above are avoided and on the other hand user-friendliness is significantly increased.

The objective is achieved by the invention.

The method according to the present invention is characterized in that symbols for the production resource connected via a network or the management tools associated with the production resource, such as configuration systems or database systems, are present and selectable on the central operating unit or units, wherein after selection of one or several symbols on the central operating unit or units, for example on the screen of a computer, the visualization from the associated production resource or management tool is started or executed on the computer and subsequently complete representation and operation is possible by the cooperation of the visualization software present at the (central) operating unit and the control software running decentrally in the production resource.

The advantage here is that the operator can operate and monitor all the production resources from a central location, whereby a suitable operator interface is displayed to him or her for this purpose, which is stored on the production resources and has been loaded directly from the production resources to the central operator unit and is then executed on the central operator interface. Typically, but not necessarily, the user interface stored for the central operating unit on the production resources corresponds at least to the user interface on the production resources. This enables the user to work with the operating logic belonging to the respective production resources and thus does not necessitate retraining on new menu structures or functionalities.

It is also advantageous that the local execution of the visualization component on the central operating unit, possibly using existing graphics acceleration hardware (GPU), and the efficient data transmission even enable a high-resolution virtual representation of the respective operating unit of a production resource. If the production resource is an industrial robot, it is even possible to track the movement of the industrial robot(s) and not only to have data or values, respectively, displayed, as known from the state of the art. It is also possible for the respective scenes to be displayed enlarged on the central operating unit so that the movement process or animations can be understood more precisely. Thus, it is possible that an optimization of the motion sequence in order to increase the production speed and/or avoid errors can be carried out by appropriate analyses. Likewise, any available animations of the production resources that may be present can be displayed freely on the central operating unit.

Advantageous embodiments are those in which several instances of the visualization component of the same or different production resource run simultaneously on the central operating unit independently of each other, so that different screen pages and thus different elements of information from the controller(s) are displayed simultaneously or side by side. This makes it possible for several instances of the same visualization component and the same production resource to be started on the central user interface, whereby different screen pages and thus different elements of information from the controller can be displayed simultaneously and side by side. This gives the operator a better overview of the condition of the production resources, as several freely selectable screen pages with corresponding information are displayed next to each other.

In an advantageous embodiment, the transfer of the software component for the visualization of a production resource is transmitted, if possible, preferably only when this production resource is called up for the first time, and subsequently remains stored in the operating unit, preferably in a cache, in order to achieve faster response behavior the next time the production resource is selected.

This ensures that the visualization component to be started is already stored locally on the central operating unit and can therefore be started immediately. It eliminates the time necessary for transfer of the software component. For example, if two or more production resources of a specific type have the same software version concerning the visualization component, it is sufficient to transfer the software when connecting to the first device. For the second and each subsequent device, this is no longer necessary. For the second and each additional device, simply another instance of the already locally existing visualization component is started. However, each instance connects to the respective other device and therefore also displays the information for exactly this device.

Several software versions of visualization components of production resources of the same type are stored in the storage system of the central operating unit, so that the in each case the software version is loaded that exactly matches the software version of the connected production resources. This ensures that only those functions can be executed that are supported by the corresponding version, thus guaranteeing operational safety and preventing sources of error due to incorrect function settings that are not supported at all.

Advantageous embodiments are such in which the functionality results from the interplay of modular software, in particular the control software, in the controls of the various production resource and the higher-level software, in particular the visualization software, in the operating unit or units in such a way that only the software modules relevant for visualization are transferred to an external hardware platform, for example a computer, and these cooperate with the process-relevant software modules, which also remain in the operating unit or units of the production resource. This allows the visualization components for any production resources to be run many times at different localities, wherein all visualization components connect to the same device and communicate with the controller of that device, providing information from that controller to operators at the different localities. For example, in a larger plant, operating terminals may be located at several points. One instance of the visualization component runs on each of these operating terminals. Alternatively, there are several central operating units within the company or even at distributed company locations.

Advantageous embodiments are such in which the communication between the visualization component, in particular the visualization software, in the operating unit and the control software in the production resources is carried out in part or completely via the OPC UA network protocol. The OPC UA network protocol allows efficient transfer of the states of the production resources to the visualization components. The visualization components can, for example, be notified by the production resources whenever specific status changes occur. Therefore, the visualization components do not need to continuously query for state changes. The communication channel and its bandwidth for data transmission are thus not unnecessarily overburdened.

However, advantageous embodiments are also such in which the visualization of the production resources on the central operating unit is adapted to the available space on the display unit or screen of the computer, respectively, or can be adapted by the operator, and thus more or more detailed information is shown on the central operating unit than on the display of the production resources itself. This allows various data to be displayed and tracked simultaneously during the monitoring of the production process, in order to simplify optimization of the production process or to investigate any error messages that occur. Maintenance personnel usually have access only to smaller displays on the production resources, so that a laptop connected to the network via WLAN, for example, can be used as a central operating unit.

Advantageous embodiments are such in which the visualization of the production resource on the central operating unit adapts to the hardware environment that has changed in relation to the production resource, for example different drives or storage systems, on the display unit of the computer, and thus the user is offered different, restricted or extended storage locations on the central operating unit than on the display of the production resource. This makes it possible for data to be collected and stored appropriately by the central operating unit, which often has a more powerful processor and more and more reliable memory. For example, it is possible that all transmitted parameters, values, error messages of a shift are collected by the central operating unit and subsequently automatically stored, so that tracking and analysis of this shift is possible at any time.

Advantageous embodiments are such in which, when a production resource in the network, in particular a mobile peripheral device, for example a temperature control unit, granule dryer or conveyor, metering unit, etc., is removed or added due to changed requirements for the production of an injection-molded part, a corresponding automatic adaptation of the presentation of the symbols on the central operating unit(s) takes place or is offered for display or communication. This ensures that the user interface is automatically adapted so that feedback from maintenance personnel on changes to the production resources, which often used to be incomplete, is no longer necessary. Thus, the maintenance work can be performed without feedback of the changed composition of a work cell.

However, advantageous embodiments are also such in which links between production resources and physical production cells or work cells, respectively, which result from the network topology and can arise anew at any time, are also reflected on the central operating unit(s). This can allow for a complete representation of how each production resource cooperates with the further actual production resource and/or the physical production cells or work cells, respectively. Such physical production resource or work cells, respectively, are used to define that several production resource, which preferably do not work in one work cell, are grouped together in order to produce an injection-molded part, i.e., for example, several temperature control units distributed in the production hall and connected to a wide variety of injection-molding machines are virtually assigned to these injection-molding machines.

Thus, the operator at the central operating unit does not need to know the composition of the work cells in detail, nor does he or she need to know which peripheral device can be reached at which address.

Advantageous embodiments are such in which the software, in particular the visualization software, of the central operating unit can also read data, for example digital or analog states, quality data, process parameters, variable values, preferably via OPC UA from the connected production resource and process, evaluate, correlate, display or store them across production resources or across work cells. This makes it possible to follow the ongoing production workflow on the operating unit. Here it is also possible for the virtual representation to change according to the data supplied so that, for example, the production process of an injection-molded part can be displayed and tracked on the operating unit, i.e. the data, values, etc. are not only displayed, but they can also be related and, for example, the process parameters of the injection-molding machine, the temperature of the cold runners of the injection mold, the drying temperature of the granules, the mixing ratio of different granule materials, additives and colors, etc. can be tracked.

Advantageous embodiments are such in which the software, in particular the visualization software, of the central operating unit can also read alarms or error messages or user interactions, preferably via OPC UA, from the connected production resources and process, evaluate, correlate, display or store these across production resource or across work cells. This enables the status of the entire production workflow in the industrial installation to be recorded at a glance and optimally deploys maintenance personnel to the relevant production resources when error messages occur. Consequential faults, i.e. failure of production resources triggered by the failure of preceding production resources, can also be detected.

Advantageous embodiments are also such in which a user can log in to the central operating unit with a user level and the associated user level is applied automatically, or according to a predefined but customizable assignment table, to the user levels of the visualization component of the production resources. This means that authorized persons do not have to log in separately to each production resource, which on the one hand saves time and on the other hand means that the person needs to remember only 1 password for the central operating unit, rather than for each production resource.

Advantageous embodiments are such in which the user can change the display language of the central operating unit at the central operating unit, whereby the selected language is also automatically used for the visualization components of the production resources displayed in the central operating unit or acts as a default setting, respectively.

This means that the operator, often skilled personnel from another country, does not have to set the display language for monitoring the industrial installation separately for each production resource, but only once for himself or herself.

Advantageous embodiments are those in which a configurable or automatically configured overview of the states, for example the operating status, of the connected production resources is displayed on the central operating unit. This ensures that the operating status of the production resources is clearly displayed and e.g. error messages are detected more quickly and can therefore be rectified more quickly, so that the downtime of the production resources and/or the entire work cell can be reduced.

In an advantageous embodiment, a software update of the connected production resources can be triggered from the central operating unit. This means that the operator can perform or at least prepare the installation of software updates in the production resources directly from the central operating unit, so that the production resource is brought up to the latest software status and can remain in production for longer, thus reducing the downtime for such maintenance and also minimizing the time required by the operator/maintenance specialist. For example, it is possible that for one or several work cells, the updates are prepared at the operating unit for several production resources located therein, so that all updates are installed automatically at the same time when the work cell is switched off for maintenance purposes or a shutdown. This means that maintenance personnel do not have to install the update manually for each production resource.

Finally, in advantageous embodiments the production resource comprises at least an injection-molding machine, a robot or an automation system, a temperature control unit, a cooling unit, a flow controller, a granule dryer or conveyor, or a metering unit or a work cell controller. This means that all the devices required for the production of an injection-molded part can be displayed virtually on the operating unit.

As a matter of principle, it can be said that the solution according to the present invention allows optimum control and monitoring of an industrial installation consisting of a large number of production resource, whereby in the event of a failure of one or several production resources, the downtime can be kept as short as possible, since the visual workflow on the operating unit also immediately displays the error messages and countermeasures can be taken to prevent subsequent faults.

The invention is now explained in more detail by means of several exemplary embodiments shown in the drawings, wherein the invention is not limited to the illustrations shown, in particular not to the structure and design of the systems.

Figure 2:
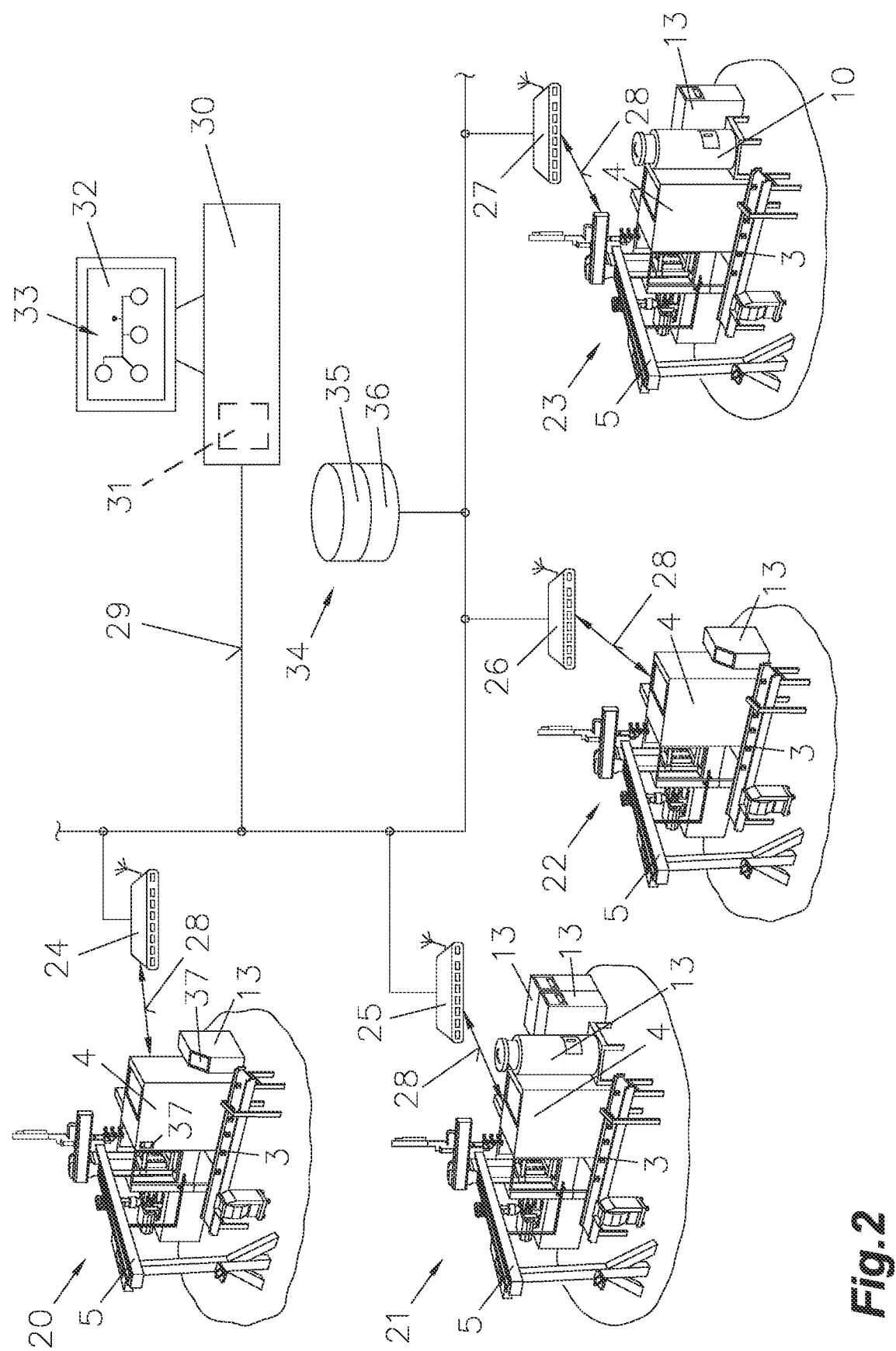
Figure 3:
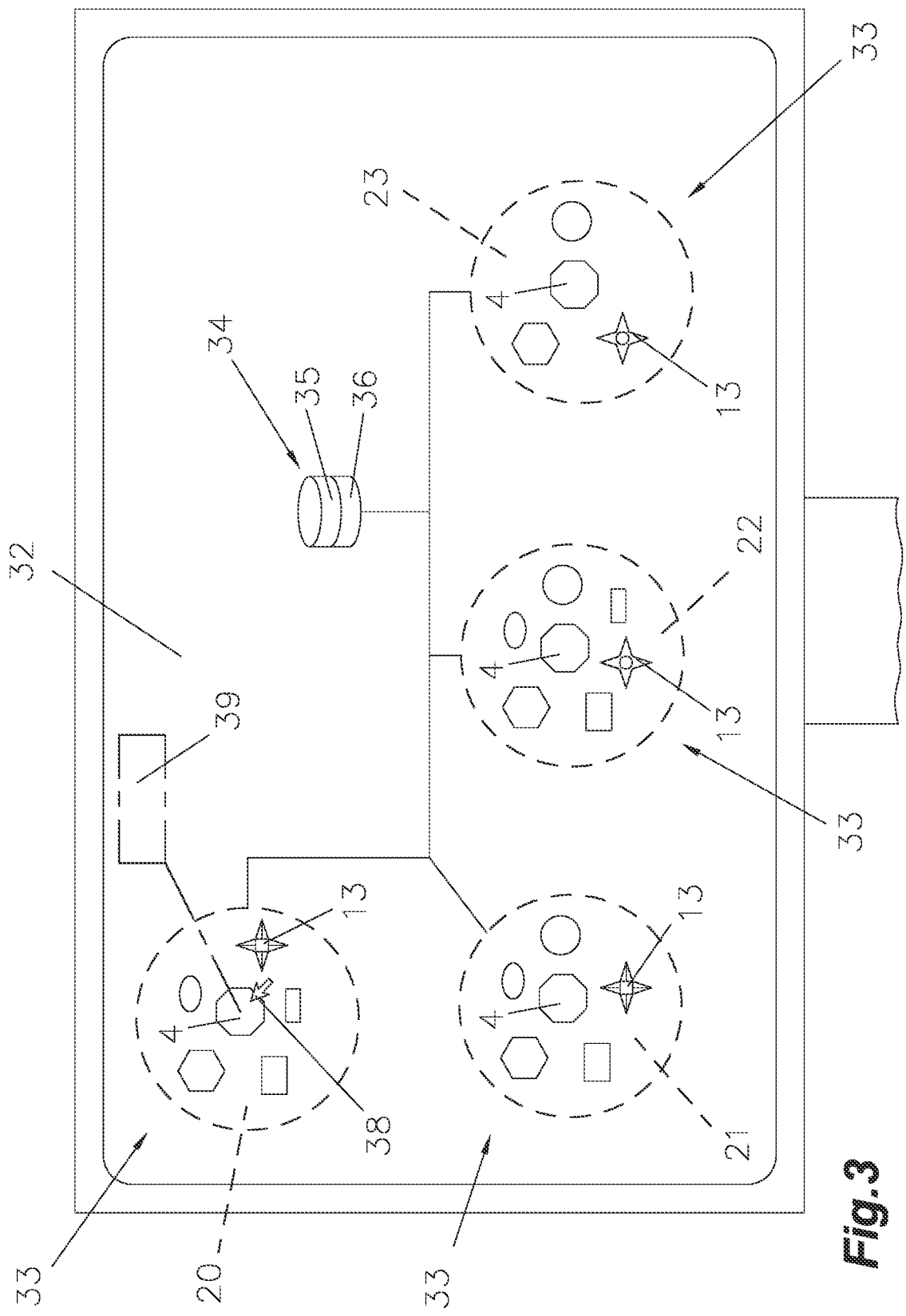
Figure 4A:
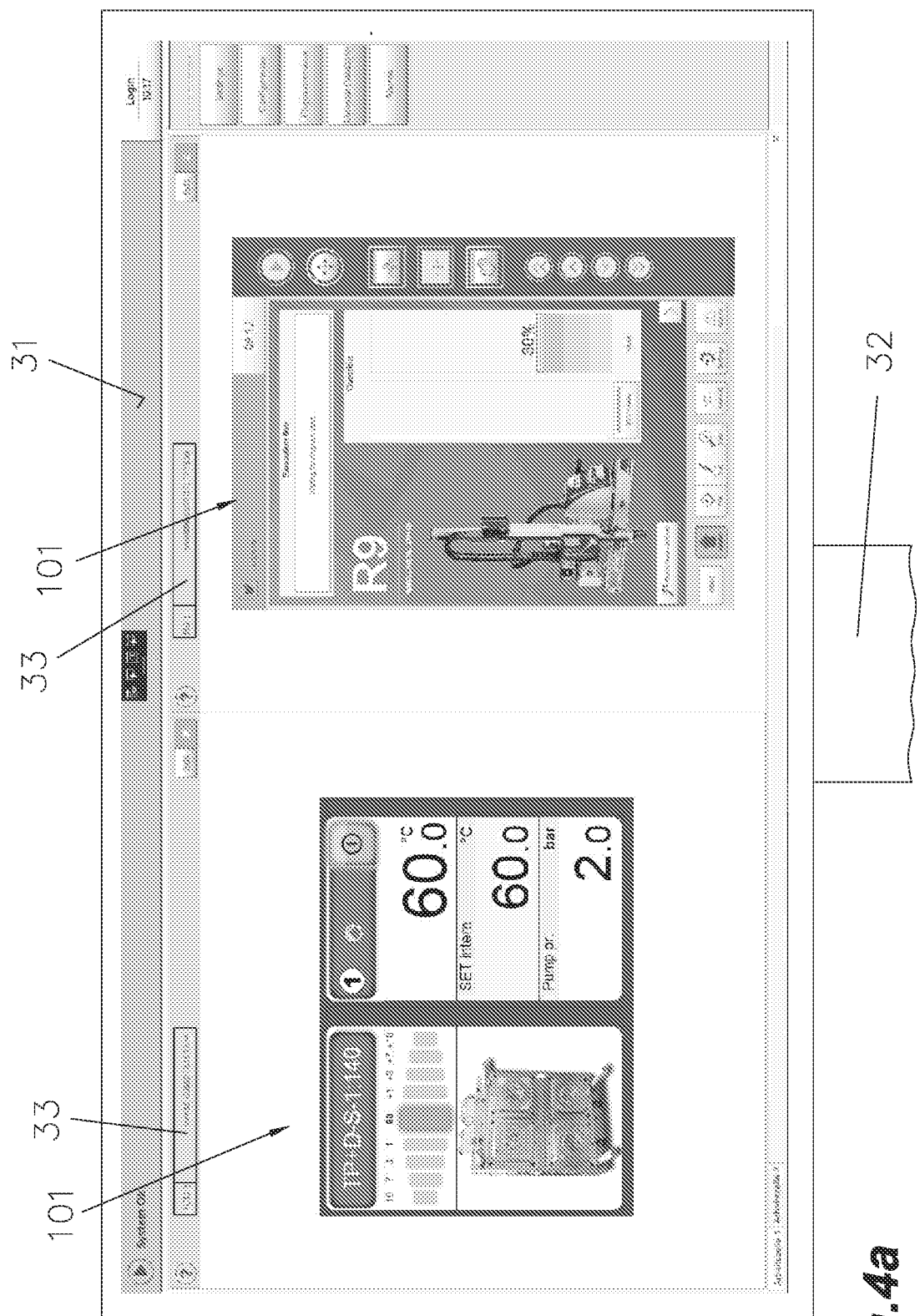
Figure 4B:
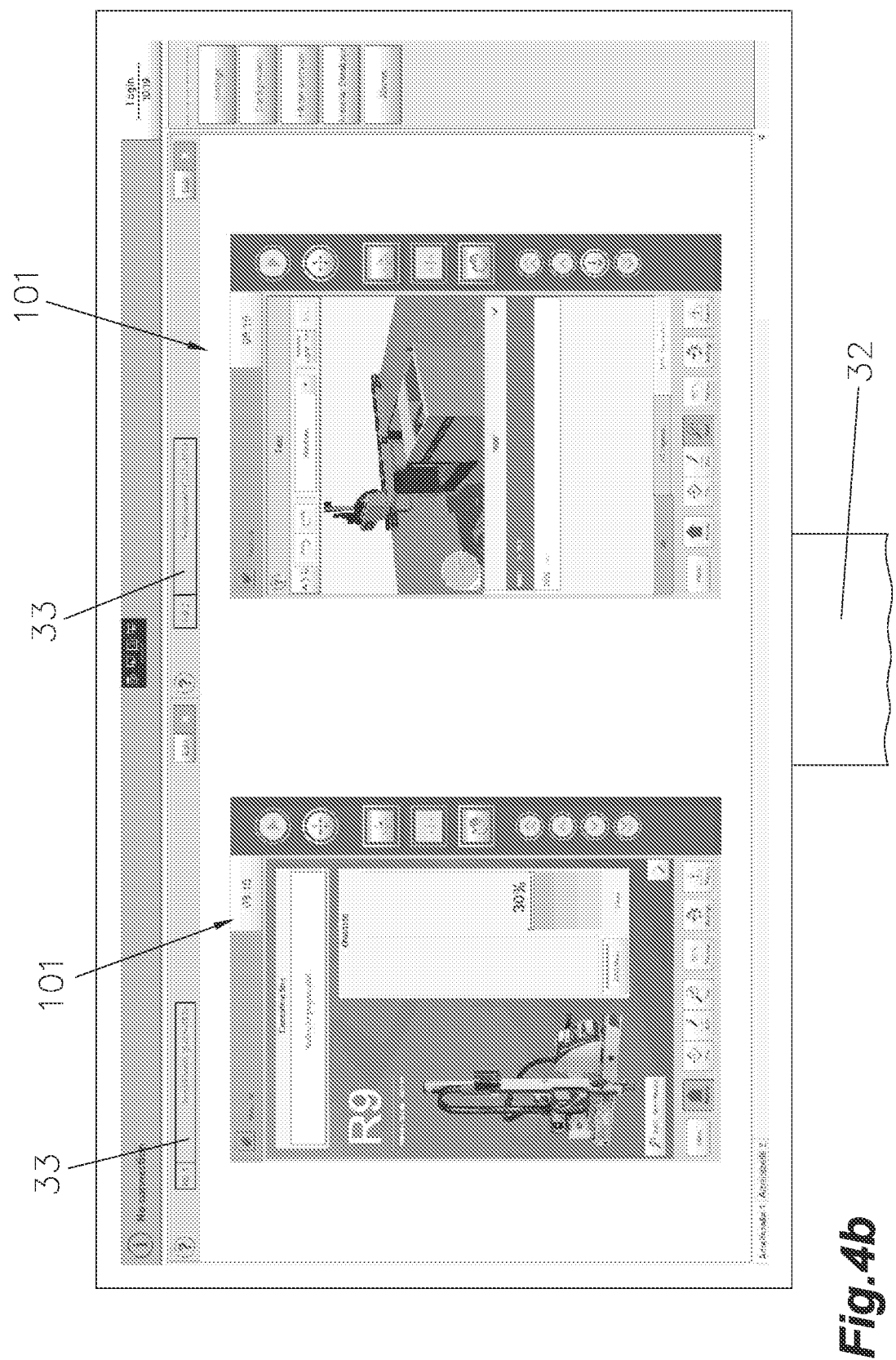
Figure 4C:
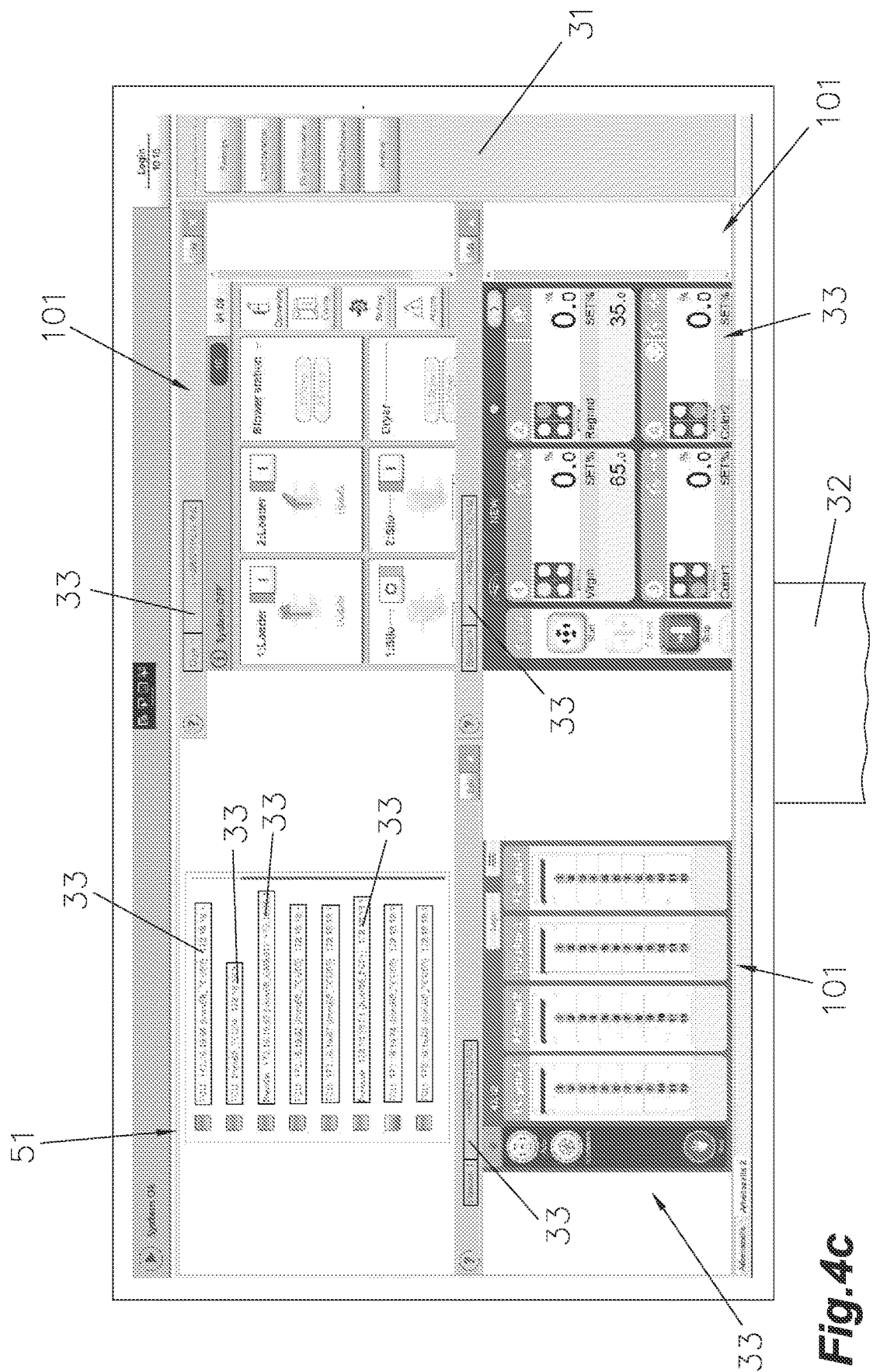
Figure 5:
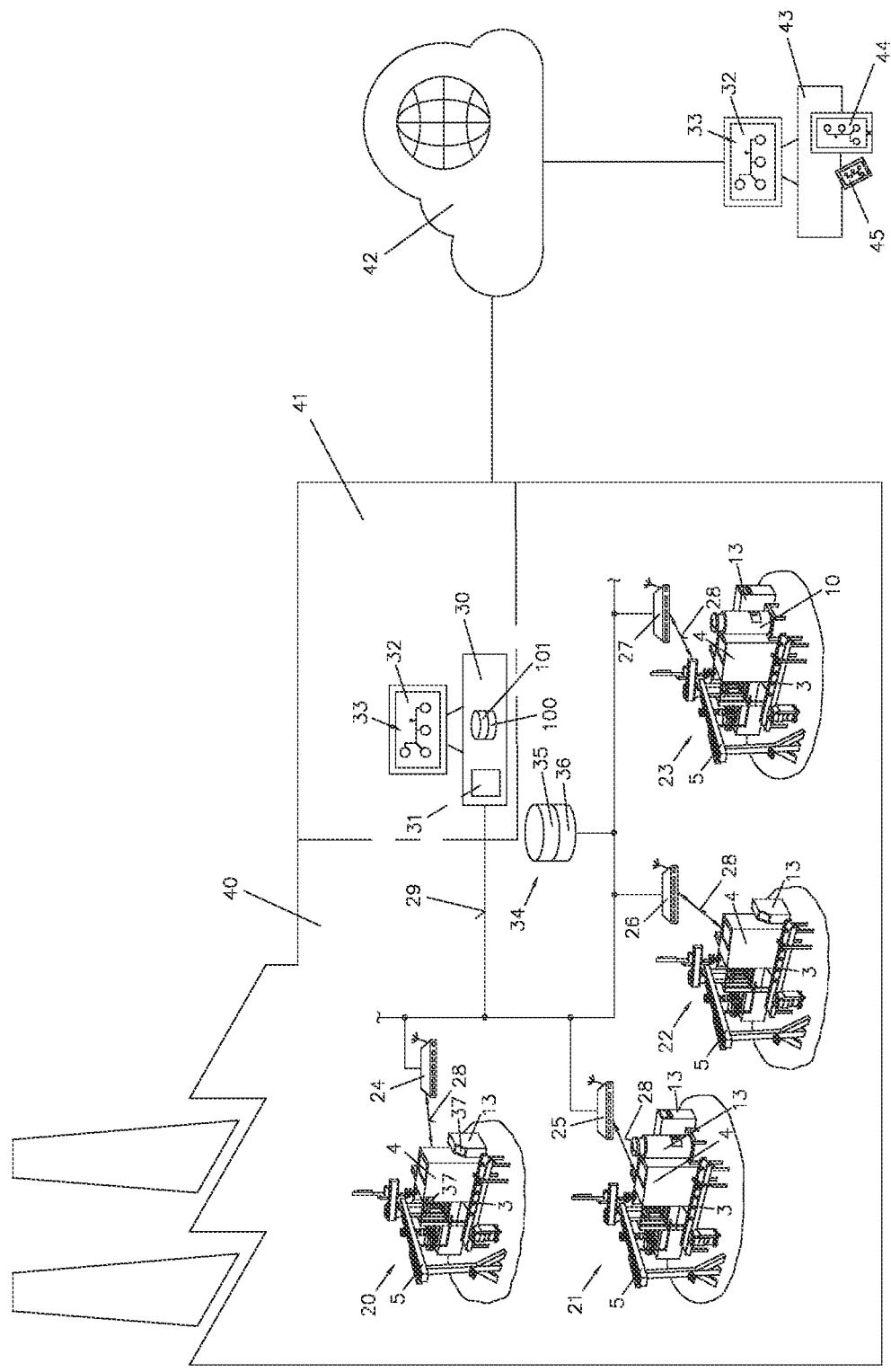
Figure 6:
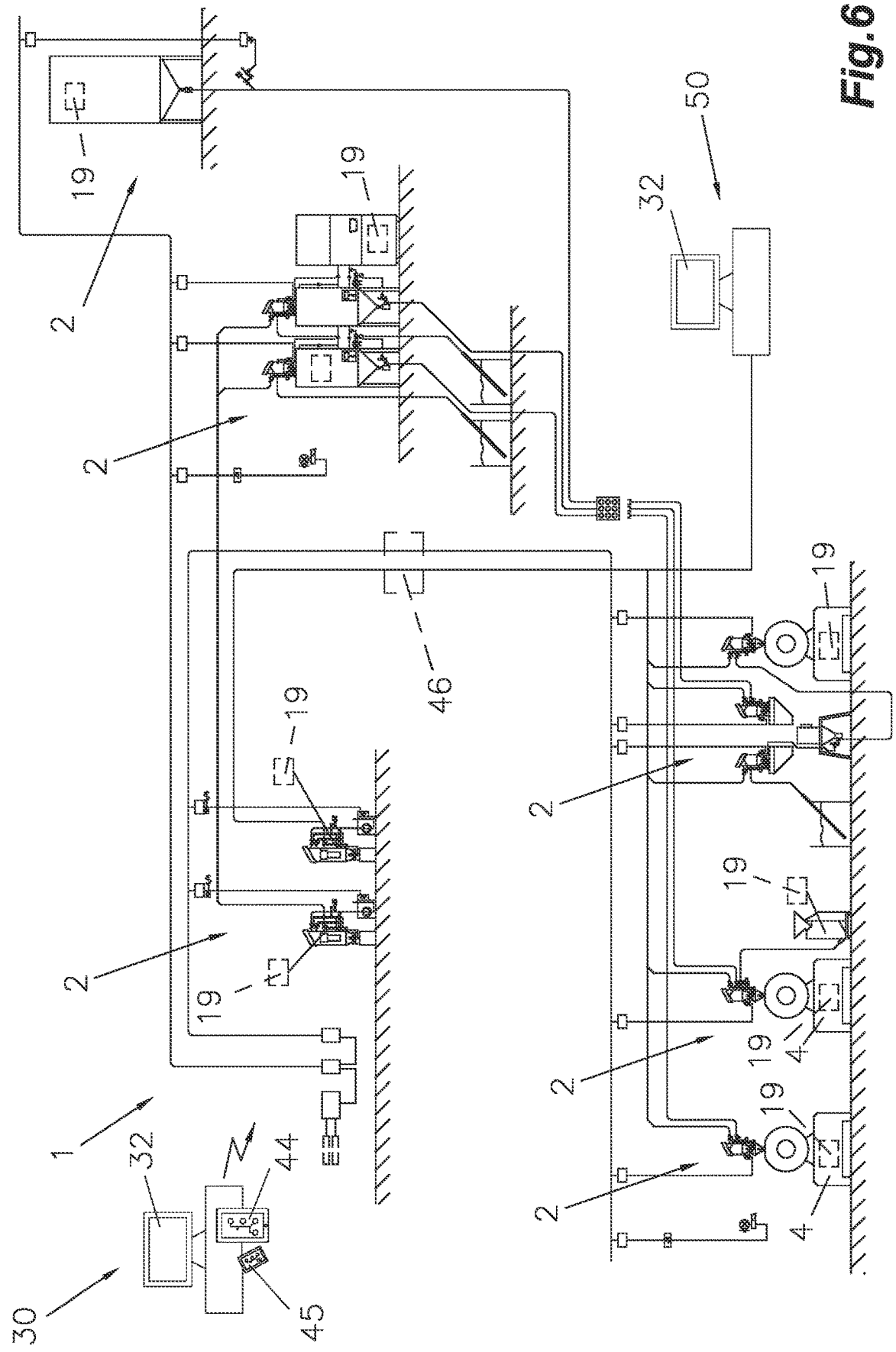

The figures show:

FIG. 1—an overview illustration of a plastics-processing industrial installation in a work cell, simplified, for illustrative purposes only;

FIG. 2—a schematic representation of an industrial installation with several networked work cells, simplified, for illustrative purposes only;

FIG. 3—a schematic representation of the central operator unit, in particular a screen display of the detected production resources;

FIG. 4a—a screen display of the visualization components of two detected symbols on the central operating unit; simplified, for illustrative purposes only;

FIG. 4b—another screen display of the same visualization component in duplicate in a different display mode; simplified, for illustrative purposes only;

FIG. 4c—a further screen display with an overview page for several symbols and three further visualization components of different production resource, in simplified, schematic representation; simplified, for illustrative purposes only;

FIG. 5—an overview of a global networking with an external control room; simplified, for illustrative purposes only;

FIG. 6—a further schematic representation of a plastics industry system whose production resources are connected to several control rooms, one of which is designed as part of a central conveyor system, in part wirelessly, preferably via WLAN; simplified, for illustrative purposes only.

It should be stated by way of introduction that, in the individual embodiments, the same parts are provided with the same reference numbers or same component designations, wherein the disclosures contained in the entire description can, by analogy, be transferred to identical parts with identical reference numbers or identical component designations, respectively. The position details selected in the description, such as, e.g., top, bottom, lateral, etc., likewise relate to the figure described, and in the event of a change of position, they are to be transferred to the new position by analogy. Individual features or feature combinations from the exemplary embodiments shown and described may also represent independent inventive solutions.

FIGS. 1 to 6 show an industrial installation 1 for injection-molding applications, in which the individual production resources 2, production devices, for producing one or several products/semi-finished products or injection molded parts 3 are connected. Preferably, an injection-molding machine 4 is used as the processing machine, to which a robot 5 or handling robot, respectively, for removing the produced injection-molded part 3 is assigned. Here, the injection-molded part 3 is removed from an opening injection mold 7 by an extraction device 6, in particular a gripper equipped with gripping tongs and/or suction nozzles, and deposited on a device, in particular a conveyor belt 8.

For example, it is possible that for the production of an injection-molded part 3 plastic granules or powder are fed to the processing machine 4 via a granule conveyor 9 and possibly via a metering device 11 or from a granule dryer 10. By means of a temperature control unit 13 and/or cooling unit, the injection mold 7 can be kept at operating temperature by feeding a temperature control medium, or heated or cooled accordingly, respectively, so that optimum processing of the plastic granules or powder, which must be plasticized for injection into the injection mold 7, is made possible.

In addition, the system can be equipped with a monitoring device 15, in particular a camera system, in order to be able to carry out an automatic quality control of the manufactured product 3. Very often there are also upstream or downstream automation systems 16 present, e.g. sprue cutter 17, centering, separating, feeding, crate and pallet stacking stations, etc., which are directly integrated into the robot controller or industrial installation 1, respectively, and controlled by it via digital or analog signals or other communication interfaces. The creation of the flow and control logic for the robot 5 or handling robot 5, respectively, and any connected automation components 16 or systems, respectively, is typically carried out in a teach-in procedure, for which an appropriate teachbox 18 or robot controller, respectively, can be used.

In order for the individual devices to be adjustable or programmable, respectively, they are preferably equipped with corresponding control electronics or controller, respectively, 19, as shown schematically, wherein the setting or programming, respectively, is entered and displayed via displays arranged on the devices or the teachbox 18. A connection can be established with the individual components via the teachbox 18, so that a correspondingly stored surface for this production resource 2 is invoked. Of course, it is also possible to program or adjust, respectively, the devices via an external component connected to the production resources 2 via an interface.

For the sake of completeness, it is also mentioned that all devices are connected to corresponding lines, in particular power supply, network and connection lines, liquid supply lines, material lines, etc., which in the interest of clarity were not displayed in the representation shown. Also, such production resources 2 are preferably combined into one or several work cells 20 to 23, as shown schematically in FIG. 2, wherein a work cell controller 24 to 27 can be used for communication of the production resource 2 within and outside the work cells 20 to 23. The work cell control 24 to 27 is connected via lines 28 to the production resource 2 within the work cell 20 to 23, wherein the production resource 2 is automatically detected by the work cell control 24 to 27, whereupon the work cell control 24 to 27 carries out, on the one hand, communication or data exchange, respectively, with the in-house network 29, in particular an intranet and/or an internet, and/or a central operating unit 30, and, on the other hand, with the production resource 2 of the work cell 20 to 23 and establishes direct communication among the production resources 2.

For such large industrial installations 1, a very high effort is necessary for the start-up and registration of the individual production resource 2. Since the same devices or production resources, respectively, 2 are often used in the individual work cells 20 to 23, it is necessary that the greatest care be taken by the assemblers and software supervisors upon registration of the production resources 2.

According to the present invention, it is now envisioned that an automatic virtual representation is generated on the central operating unit 30, which is connected to the network 29 or to the work cell controllers 24 to 27, respectively, by activating a visualization software 31 in the central operating unit 30, which performs data exchange with the production resource 2 directly or with the individual work cells 20 to 23, in particular with the work cell controllers 24 to 27, and displays a schematic design of the industrial installation 1 preferably in the form of symbols 33 of the production resource 2 used on a screen 32 or touchscreen, respectively, i.e. that symbols 33 for the production resource 2 connected via the network 29 or the management tools 34 associated with the production resource 2, such as configuration systems 35 or database systems 36, are present and selectable on the central operating unit 30. Preferably, for each type of a production resource 2, different, preferably industry-standard symbols 33 are shown, so that on the basis of the symbols 33 it is already possible to draw conclusions about the devices or production resource, respectively, 2 contained in a work cell 20 to 23. In FIG. 3, the injection-molding machine 4 is shown for clarification purposes e.g. in the form of an octagon, the temperature control unit 13 as a star, and so on.

After selection of one or several symbols 33 on the screen 32 of a computer or the central operating unit 30, the visualization component 101 from the associated production resource 2 or the management tool 34 is queried and retrieved or loaded, respectively, and started or executed on the computer or the central operating unit 30, i.e. a virtual representation of the operator interface of the production resource 2 and/or a virtual representation of the production resource 2 is displayed on the screen 32, which is preferably loaded directly from the production resource 2, since this ensures that, for example, in the case of newer devices with the same function which have a different design to older devices, this is also recognizable on the screen 32, so that when a device is replaced, its actual representation is always used. Subsequently, complete representation and operation of the production resources or resource, respectively, 2 is possible through the cooperation of the visualization component 101 now available on the operating unit 30 and the control software 37 running decentrally in the production resources 2.

Here, it is possible that the downloading of all visualization components 101 can be performed from the actual production resources 2 or management tool 34, respectively, by activating a software button. However, it is also possible that symbols 33 of the production resource 2 can be selected via a mouse pointer 38 or direct selection on a touch screen. For example, by positioning the mouse pointer 38 on the symbol 33 or, in the case of a touch screen, by direct selection, as schematically shown in FIG. 3 of the symbol 33 for the injection-molding machine 4, a window 39 is opened in which, for example, the most important configuration data can be read and/or also selected. Preferably, the visual representations 101 or the visualization components 101 of the production resource 2, respectively, are downloaded only once, in particular when they are first executed, and are subsequently stored in a cache 100 so that they are available as quickly as possible for subsequent reuse. Whenever a production resource 2 is selected, the software of the central operating unit 30 checks the visualization components 101 of the production resource 2, which have already been stored and are thus available locally in the cache 100, for equality of the type of the production resource 2 and the software version of the visualization component 101, and initiates a transfer of the software component or visualization component, respectively, 101 only in the event of divergence. The communication between the visualization component 101 or the visualization software (31), respectively, in the operating unit (30) and the control software (37) in the production resources 2 is carried out in part or completely via the OPC UA network protocol.

For the sake of completeness, it is mentioned that it is possible for an operator to switch between the symbol display, according to FIG. 3, or the virtual representation of the production resource or also mixed at any time. It is also possible for the visual production resource 101 or visualization components 101, respectively, to be displayed individually on the screen 32, or for the entire work cells 20 to 23 with the visualization components 101 of their production resource 2 to be displayed enlarged or reduced in size, as can be seen in FIGS. 4a to 4c, in order, for example, to be able to observe the removal process of the injection-molded part 3 by the robot 5 more closely. In addition to a topological presentation of the symbols based on their classification in work cells 20 to 23, it is also possible for the operator to freely move, position and group the displayed symbols 33 for a production resource 2 or its visual representation or figure, respectively, 101 on the screen 32 according to own guidelines. Thus, it can be said that the types of production resources 2 to be displayed, as well as the visual arrangement or layout on one or several screens 32, tab cards and the like, or the size or scale, respectively, of the visualization components 101 displayed on the central operating unit 30, can be configured by the operator, or is displayed based on the network topology, or is factory pre-configured and cannot be changed. FIGS. 4a to 4c will be discussed in more detail later.

A substantial simplification for the operator is achieved in the method according to the present invention by the fact that it is thereby possible that the most different instances or software versions, respectively, of a production resource 2 can be seen by the symbols 33 and, above all, can also be processed. For example, this is represented by the symbol 33 for the temperature control unit 13 in FIG. 3, where the symbol 33 is a star with different versions for different instances or software versions, respectively. Here, the visual temperature control unit 13 in the work cells 20 and 21 has version 1.1, whereas the same temperature control unit 13 in the work cells 22 and 23 has version 1.5. The difference can be seen, for example, by the internal formation of the star. Here, however, it is also possible that the instances or software versions, respectively, are indicated by simple numbers. In this case, the visualization of the visualization components 101 in the operating unit 30 is identical to the operation in the actual production resource 2, whereby in the event of software changes and/or enhancements in the production resource 2, these are transferred to the operating unit 30 and are available there, i.e., for example, in the event of an automatically executed software update of the work cell controller 24 to 27 for one or several production resource 2 or by a fitter during on-site maintenance work, this is detected or, upon completion of the software update, this is communicated by the control software 37 to the visualization software 31 and transferred, respectively. Here, it is also possible that a software update can be called up and executed by the operator at the central operating unit 30 for a particular production resource 2 by simply activating the symbol 33 or its visual representation and calling up the software update in the window 39 or a corresponding submenu, whereby the transmission of the new update, which includes the new control software 37 and also the matching visualization component 101, to the production resource 2 is carried out by the visualization software 31. Furthermore, automatic detection or transmission also takes place whenever one or several production resource 2 are replaced during maintenance work or a production resource 2 is moved from one work cell 20-23 to another work cell 20 to 23 in order to be able to produce another injection-molded part 3.

In an advantageous embodiment, after the start-up of one or several production resources 2, the virtual production resource, in particular the visualization component 101, is transferred and stored upon initial detection, so that such large amounts of data need to be transferred only very rarely to once and subsequently in order to reduce the amount of data transferred only the corresponding process data, in particular the actual values, are transferred to the operator unit 30, i.e. that the central operating unit 30 can also read out data, for example digital or analog states, quality data, process parameters, variable values, preferably via OPC UA, from the connected production resource 2 and process or evaluate or correlate and display these across production resource or across work cells, respectively. Due to the reduction in the amount of data, this allows representation of the data in near real-time. For example, processing by means of "machine learning" or an "AI system" or a display of the signals or data, respectively, in oscilloscope representation is also possible. In this context, it is also possible for the status, error messages, etc. from the production resources 2 to be transferred directly to the central operating unit 30 and displayed, wherein preferably different colors are displayed and shown for this purpose, such as red for error messages, green for "everything in order", blue for maintenance work, etc. In this case, a corresponding display can be shown for the symbol 33 or the virtual representation of the production resource 2, preferably in the form of a luminous dot, or alternatively the entire symbol 33 or the virtual representation of the production resource 2 can be displayed in the corresponding color.

It is also possible for the operator to have a listing of all production resources 2 generated by activating a corresponding submenu. Here, all production resources 2 can be listed one below the other and preferably in alphabetical order, whereby the associated work cell 20 to 23 is displayed next to the individual production resource 2. However, it is also possible that only a list can be evaluated in which all production resources 2 are indicated only once and next to or before this it is indicated how often this type of production resource of a production resource 2 is present in the industrial installation 1.

As a matter of principle, it should be mentioned that in the embodiment shown, the production resources 2 are combined in work cells 20 to 23, but this is not necessary; instead, the production resource 2 can be appropriately interconnected and connected to the network 29. It is also possible for the operation of the production resource 2 to take place without the work cell controls 24 to 27, but their use has the advantage that the production resource 2 can be automatically assigned to the corresponding work cells 20 to 23.

For the sake of completeness, it is mentioned that links to virtual production resources 2 or virtual work cells 20 to 23 provided locally or in the cloud are also reflected on the central operating unit or units 30, i.e., should a virtual link to a virtual production resource 2 be stored or activated, respectively, on a production resource 2, this link is also detected and displayed. This can preferably be done in different colors so that such a link is easily recognizable.

Furthermore, the central operating unit 30 can also be used for the storage of data sets, for example consisting of quality and process parameters or various settings, as well as program sequences, recipes or other configurations of individual production resources or complete work cells.

It is also possible that in addition to or instead of the central operating unit 30, the teachbox 18 of the robot 5 acts as the central operating unit 30 and thus preferably the visualization components of the production resource 2 within the work cell 20 to 23 of the robot 5 or also further work cells 20 to 23 can be selected by the user and displayed on the teach box 18. In this context, it is also possible for the terminal, in particular that of the controller 19 of the injection-molding machine 4, to act as the central operating unit 30, and thus preferably for the visualization components of the production resource 2 within the work cell 20-23 to be selected by the user and displayed on the terminal 19. Likewise, the controller of the central conveyor system 50, as shown for example in FIG. 6, can act as a central operating unit 30 so that preferably the visualization components of the production resource 2 of the production hall can be selected and displayed thereon by the user.

The virtual representation of the existing production resources 2 also makes it possible for the central operating unit 30 to support the use of 3D glasses or virtual reality or mixed reality display, whereby the visualization components of the production resource are arranged and displayed to the user in three-dimensional space. It is advantageous here if the actual layout of the industrial installation 1 is recorded in the system beforehand and the production resources 2 are provided with GPS data or markers so that a virtual tour of the industrial installation 1 is possible. For a simplified acquisition of GPS data or location data, respectively, it is sufficient if the essential production resources 2, namely the injection-molding machine 4 or the work cell controller 20 to 23, are detected because their associated further production resource 2 are arranged in the vicinity. Often, their virtual representations are already supplemented to the position to the injection-molding machine 4, so that a simple assignment can be made.

It is also possible that a production resource 2, instead of being displayed and connected via a visualization component 101 running in a modular fashion on the central operating unit 30, is displayed and connected via a mirroring technology, for example VNC or TeamViewer, and/or via a web client technology, preferably a web browser element.

Furthermore, the user can change the physical units to be used in the display of the central operating unit 30 at the central operating unit 30, whereby the selected physical units are also automatically used for the visualization components 101 of the production resource 2 displayed in the central operating unit 30, or act as a default setting, respectively. It is also possible that messages are sent to the user from the central operating unit 30, triggered by events on one or several of the connected production resource 2, preferably via email, Twitter or SMS.

It is of course possible that a wide variety of settings, such as language, 2D view, 3D view, units, etc., can be set on the central operating unit 30, which can also be transferred to the production resource 2 connected via the network 29 by activating a transmission button accordingly. Here, it is possible that the touch screen or the mouse pointer 38 can be used to select one or several virtual production resource 2 to which the settings or changes are transferred. In this context, it is also possible that when changes are made to the production resource 2, for example during maintenance work, by changing the menu language, this change is displayed on the virtual production resource or the visualization component, respectively, 101.

Furthermore, FIG. 5 shows a schematic representation of a plastics-processing industrial installation 1 in which several production resources 2 organized in work cells 20 to 23 cooperate in one or alternatively in several company buildings 40. In this context, the production resources 2 comprise at least one injection-molding machine 4, one robot or automation system 5, and preferably one or several temperature control units 13, one or several cooling units, one or several flow controllers 14, a granule dryer or conveyor 10 or one or several metering units 11 or a work cell controller 24 to 27. It can be seen that the connected production resources 2 can be monitored, regulated and controlled from the control room 41, in which the central operating unit 30 together with the visualization software 31 is located.

Here, preferably after the installation or assembly, respectively, of a new work cell 24 to 27, the acquisition of the production resources 2 is first carried out and the largest data volumes are downloaded, so that subsequently, after the start-up of the production resources 2, now merely a small amount of data transfer is required in order to have an almost real-time display of the parameters, setpoint/actual values, etc. available in the control room 41.

Furthermore, it is also possible that global or worldwide networking, respectively, in particular via the internet 42, of the company building 40 is possible, so that an external operating unit 43 can additionally be integrated or connected. In this case, it would be possible for the central operating unit 30 to be omitted in the company building 40 and for control, regulation and monitoring to also be carded out via the external operating unit 43. In this regard, it is also possible that the representation can be made on a tablet 44 or cell phone 45.

Optionally, the connection to an external operating unit 43 for maintenance activities or updates, respectively, of the production resources 2 is also used by the manufacturer of the production resources 2, who can provide corresponding updates via the internet 42. Here, it is also possible that the external operating unit 43 is designed as a server, and that the central operating unit 30 can use it to download updates, settings, operator manuals, etc.

Furthermore, FIG. 6 shows an industrial installation 1 of the plastics industry with a central conveyor system 50, which distributes and prepares the plastic granules to the individual work cells and production resources 2. It can be seen that several central operating units 30, which may be spatially separated from each other, are used for monitoring the plant, in particular the production resource 2. Furthermore a central operating unit 30 is shown, which is integrated into the operating unit of the central conveyor system 50. The visualization components 101 of the production resources 2 can thus also be displayed and operated on the central conveyor system 50, whereby the central conveyor system 50 can display the symbols 33 of the production resource 2 according to their networking according to different topological guidelines or filter criteria, e.g. according to the material-related tubing or the tubing of the suction system or on the basis of the electrical wiring. For example, by moving the mouse pointer over a symbol 33, the user can load the associated visualization component 101, wherein this is either retrieved directly from the cache 100 if already stored in the cache 100, or otherwise transferred from the production resource 2 over the network. Preferably, the individual production resource 2 are connected by wire so that secure data exchange can take place. In the exemplary embodiment shown, the central operating units 30 are connected via a wireless connection, in particular via WLAN, to a production resource 2 or a WLAN station 46, as indicated by dashes, via which the data and connection are sent to the production resource 2. This WLAN station 46 can also be used to connect a cell phone 45 or tablet 44 directly to the production resources 2, so that data can also be retrieved and/or corresponding control commands can also be executed at any time.

As briefly mentioned before, several screen displays in different display variants are shown in FIGS. 4a to 4c. Here, it can be seen from FIG. 4a that the left half of the screen 32 shows the visualization component 101 of a production resource 2, in this example a temperature control unit 13. The title bar of the window shows the corresponding symbol 33. On the right side, symbol 33 and visualization component 101 of another production resource 2, an extraction robot 5, from the same work cell 20 to 23 are displayed.

FIG. 4b shows a similar arrangement as FIG. 4a, but here the same production resource 2, an extraction robot 5, is shown on the left and right. In this case, the visualization component 101 for this one robot 5 is loaded or started, respectively, twice and displayed once on the left and once on the right. It is thus achieved that the operator can have different views of one and the same production resource 2 displayed on the screen 32 at the same time, whereby he or she can observe a plurality of state variables simultaneously or observe effects of changes on one side on the other side, respectively.

Finally, FIG. 4c shows an overview of the operating status 51 of several selected production resources 2 in the upper left corner, wherein the production resource 2 is represented by its symbol 33. In the 3 further areas, visualization components 101 of further production resources 2 are displayed, in this case a granule dryer 10 together with the associated conveyor control, a flow controller 14 and a gravimetric dosing device 11.

The operator can log in to the central operating unit 30 via the "Login" button at the top right, and display and monitor the production resources 2 via its visualization components 101 hereby from the screen 32 of the central operating unit 30 according to his or her user level. For this purpose, the user level is passed on by the visualization software 31 to the visualization components 101, so that the operator has to remember only 1 password for all visualization components 101 or has to log in only 1 time, respectively, and can then operate all production resource 2 via their visualization components 101.

It is pointed out that the invention is not limited to the embodiments shown, but may comprise further embodiments and designs.

The invention claimed is:

1. A method for displaying and operating one or more production devices on one or more central operating units, wherein at least one production device is present, and wherein one or more symbols for the one or more production devices that are connected via a network are present and selectable on the one or more central operating units, said method comprising:
selecting, by the one or more central operating units, one or more of the symbols on a screen of the one or more central operating units;
transferring, by the one or more production devices, a visualization component from the one or more production devices to the one or more central operating units based on the selecting of the one or more symbols;
executing, by the one or more central operating units, the visualization component to display a complete representation and operation of the one or more production devices based on a cooperation of a visualization software available in the one or more central operating units and a control software that continues to run decentrally in the one or more production devices; and
storing the visualization component of the one or more production devices in the one or more central operating units in order to achieve a faster response behavior at a next selection of symbols associated with the one or more production devices,
wherein functionality results from an interaction of the control software and the visualization software with software modules relevant for visualization are transferred to the one or more central operating units by the one or more production devices and wherein the software modules relevant for the visualization cooperate with process-relevant software modules to remain in the control of the one or more production devices.

2. The method according to claim 1, wherein: multiple instances of the visualization component or the one or more symbols, respectively, of a same or different production devices run simultaneously on the one or more central operating units independently of one another, so that different screen pages and thus different information items from a controller or controllers are displayed simultaneously or side by side.

3. The method according to claim 1, wherein: communication between the visualization component, or the visualization software, in the one or more central operating units and the control software in the one or more production devices is carried out in parts or entirely via an OPC UA network protocol.

4. The method according to claim 1, wherein: the visualization of the one or more production devices on the one or more central operating units is configured to an available space on a display unit or the screen, respectively, of a computer or configured by an operator, and thus more detailed information is displayed on the one or more central operating units than on the display unit of the one or more production devices itself.

5. The method according to claim 1, wherein: the visualization of the one or more production devices on the one or more central operating units adapts to a hardware environment on a display unit of a complete computer, which has changed with respect to the one or more production devices, and thus different, restricted or extended storage locations are offered to a user on the one or more central operating units than are on a display of the one or more production devices.

6. The method according to claim 1, wherein: when the one or more production devices is on the network, selecting from among a temperature control unit, a granule dryer a conveyor, a metering unit, is removed or added on the basis of changed requirements for the production of an injection-molded part, a corresponding automatic adaptation of the presentation of the symbols takes place on the one or more central operating units or is offered for display or communication.

7. The method according to claim 1, wherein: links between the one or more production devices to physical production cells or work cells, respectively, which result from a network topology and newly formed at any time, are also reflected on the one or more central operating units.

8. The method according to claim 1, wherein: software, including the visualization software, of the one or more central operating units reads data, including digital or analog states, quality data, process parameters, variable values.

9. The method according to claim 1, wherein: software, including the visualization software, of the one or more central operating units reads alarms or error messages or user interactions.

10. The method according to claim 1, wherein: a user logs on to the one or more central operating units with a user level, and the user level associated therewith is transferred automatically, or according to a predetermined but adaptable assignment table, to the user levels of the visualization component of the one or more production devices.

11. The method according to claim 1, wherein: a user changes a display language of the one or more central operating units at the one or more central operating unit, and a selected language is automatically used also for the visualization component of the one or more production devices displayed in the one or more central operating units or acts as a default setting, respectively.

12. The method according to claim 1, wherein: a configurable or automatically configured overview of statuses, including operating statuses, of a connected one or more production devices that displayed on the one or more central operating units.

13. The method according to claim 1, wherein: a software update of the connected one or more production devices triggered from the one or more central operating units.

14. The method according to claim 1, wherein: software, including the visualization software, of the one or more central operating units reads data, including digital or analog states, quality data, process parameters, variable values, via OPC UA, from the connected one or more production devices and process, evaluate, correlate, display or store them across the one or more production devices or across work cells.

15. The method according to claim 1, wherein: software, including the visualization software, of the one or more central operating units reads alarms or error messages or user interactions, via OPC UA, from the connected one or more production devices and process, evaluate, correlate, display or store them across the one or more production devices or across work cells.

* * * * *